United States Patent
Li

(10) Patent No.: US 11,081,843 B1
(45) Date of Patent: Aug. 3, 2021

(54) INTELLIGENT SOCKET CONTROL SYSTEM FOR PREVENTING CHILDREN FROM ELECTRIC SHOCK

(71) Applicant: ANHUI GEEK DISCOVERY SCIENCE AND TECHNOLOGY CO., LTD., Anhui (CN)

(72) Inventor: Longyun Li, Anhui (CN)

(73) Assignee: ANHUI GEEK DISCOVERY SCIENCE AND TECHNOLOGY CO., LTD., Anhui (CN)

( * ) Notice: Subject to any disclaimer, the term of this patent is extended or adjusted under 35 U.S.C. 154(b) by 474 days.

(21) Appl. No.: 16/309,465

(22) PCT Filed: Oct. 31, 2018

(86) PCT No.: PCT/CN2018/112984
§ 371 (c)(1),
(2) Date: Dec. 13, 2018

(87) PCT Pub. No.: WO2020/062399
PCT Pub. Date: Apr. 2, 2020

(30) Foreign Application Priority Data

Sep. 28, 2018 (CN) .......................... 201811142650.4

(51) Int. Cl.
*H01R 13/66* (2006.01)
*H01R 13/713* (2006.01)

(52) U.S. Cl.
CPC ....... *H01R 13/6683* (2013.01); *H01R 13/713* (2013.01)

(58) Field of Classification Search
CPC .......................... H01R 13/6683; H01R 13/713
(Continued)

(56) References Cited

U.S. PATENT DOCUMENTS

| 2005/0157451 | A1* | 7/2005 | Kuo | ..................... H01R 25/003 361/622 |
| 2008/0160810 | A1* | 7/2008 | Ferguson | ............... H01R 13/44 439/188 |

OTHER PUBLICATIONS

DE-2019-19040; entire specification, drawings (Year: 2019).*
DE-2018-94101C; entire specification, drawings (Year: 2018).*

* cited by examiner

*Primary Examiner* — Dharti H Patel
(74) *Attorney, Agent, or Firm* — JCIPRNET

(57) ABSTRACT

The present application provides an intelligent socket control system for preventing children from electric shock, which includes: personnel monitoring module, configured to continuously monitor if there is a person in the monitored area; information determining module, configured to determine the age of a person in the monitoring area when it is monitored the person in the monitoring area; socket control module, configured to control the power-on indicator of the socket in the monitoring area turn off and control the jack baffle of the socket in the monitoring area close according to the age of the person in the monitoring area, wherein, when the jack baffle of the socket is closed, the jack of the socket cannot be inserted. In this way, when the person in the monitoring area is considered as a child because of his/her age, the power-on indicator of the outlet in the control monitoring area is controlled to turn off, preventing the indicator light on the socket from attracting the child to touch the card, to prevent the child from getting an electric shock when playing the socket. At the same time, the jack baffle of the socket in the monitoring area is controlled to close, to prevent the child from inserting a finger or a metal object into the jack of the socket to protect the safety of the child and prevent the child from operating the socket to cause harm to the child.

7 Claims, 1 Drawing Sheet

(58) Field of Classification Search
USPC .............................................................. 361/1
See application file for complete search history.

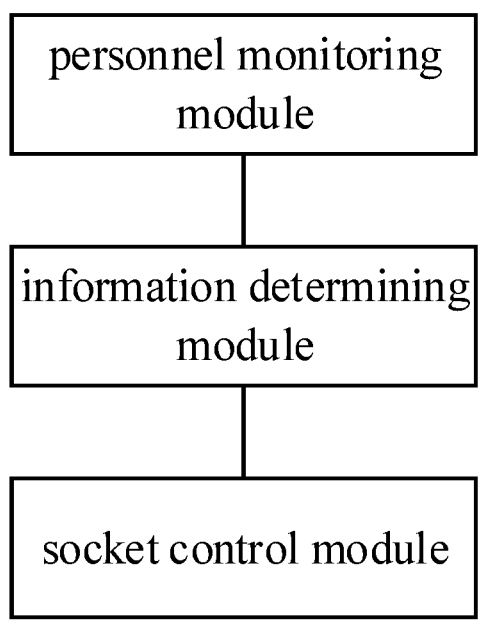

INTELLIGENT SOCKET CONTROL SYSTEM FOR PREVENTING CHILDREN FROM ELECTRIC SHOCK

The present application claims priority to Chinese patent application NO. 201811142650.4, filed to the Chinese Patent Office on Sep. 28, 2018, entitled "Intelligent socket control system for preventing children from electric shock", the entire disclosure of which is incorporated herein by reference.

BACKGROUND

Technical Field

The present application relates to the technical field of Internet of Things, and in particular, to intelligent socket control system for preventing children from electric shock.

Background Art

Power socket are the basic product of electrical connections, and intelligent socket provide external communication connectivity based on traditional mechanical power socket. The safety of power use has always been a focus and improvement in the electrical field. There are a large number of safety protections for sockets on the market. The protections include basically the protections of safety of use and abnormality of use. The protection of safety of use mainly lies in the protection against electric shock to the socket. The protection of abnormality of use mainly includes anti-surge, leakage protection and overcurrent protection.

However, the above are only for the socket itself. At present, the sockets used in the home will bring safety hazards to the users during use, especially to children who are not aware of things. Because children are curious or attracted by the lighting of the socket, they are easy to touch the live socket, while the parents are busy in housework, not always staring at children, which increases the probability of a child's electric shock.

SUMMARY OF THE INVENTION

Based on the technical problems existing in the background art, the present application provides an intelligent socket control system for preventing children from electric shock.

The present application provides an intelligent socket control system for preventing children from electric shock, which includes:

personnel monitoring module, configured to continuously monitor if there is a person in the monitored area;

information determining module, configured to determine the age of a person in the monitoring area when it is monitored the person in the monitoring area;

socket control module, configured to control the power-on indicator of the socket in the monitoring area turn off and control the jack baffle of the socket in the monitoring area close according to the age of the person in the monitoring area, wherein, when the jack baffle of the socket is closed, the jack of the socket cannot be inserted.

In a preferred technical scheme, the personnel monitoring module is specifically configured to: monitor whether there is a person in the monitoring area by using a human body infrared sensing device.

In a preferred technical scheme, the information determining module is specifically configured to:

collect face images of a person in the monitoring area, when the person is monitored in the monitoring area;

perform feature recognition on the face image of the person in the monitoring area, and determine the age of the person in the monitoring area.

In a preferred technical scheme, the information determining module is specifically configured to:

identify intelligent devices in the monitoring area when monitoring person in the monitoring area;

determine the age of the person in the monitored area by reading the age of the user stored in the intelligent device.

In a preferred technical scheme, the information determining module is specifically configured to: determine the intelligent device connected to the preset wireless local area network in the monitoring area as the intelligent device in the monitoring area.

In a preferred technical scheme, the socket control module is specifically configured to: control the power-on indicator of the socket in the control monitoring area turn off and control the jack baffle of the socket in the monitoring area close, when all the ages of persons in the monitoring area are less than a preset age threshold.

In a preferred technical scheme, alarm module is further included, connected to the socket control module, and the alarm module is configured to send an alarm notification to the preset intelligent terminal when the socket control module control the power-on indicator of the socket in the monitoring area turn off.

In the present application, the personnel monitoring module continuously monitors whether there is a person in the monitoring area, the information determining module determines the age of the person in the monitoring area when monitoring the person in the monitoring area, and the socket control module controls the power-on indicator of the socket in the monitoring area turn off and controls the jack baffle of the socket in the monitoring area close according to the age of the person in the monitoring area. In this way, when a person enters the monitoring area, the age of the person in the monitoring area is determined. And when the person in the monitoring area is considered as a child because of his/her age, the power-on indicator of the outlet in the control monitoring area is controlled to turn off, preventing the indicator light on the socket from attracting the child to touch the card, to prevent the child from getting an electric shock when playing the socket. At the same time, the jack baffle of the socket in the monitoring area is controlled to close, to prevent the child from inserting a finger or a metal object into the jack of the socket to protect the safety of the child and prevent the child from operating the socket to cause harm to the child.

BRIEF DESCRIPTION OF DRAWING

FIG. 1 is a schematic block diagram of intelligent socket control system for preventing children from electric shock according to the present application.

DETAILED DESCRIPTION OF THE EMBODIMENTS

Referring to FIG. 1, the present application provides intelligent socket control system for preventing children from electric shock, which includes:

Personnel monitoring module, configured to continuously monitor if there is a person in the monitored area; the personnel monitoring module is specifically configured to:

monitor whether there is a person in the monitoring area by using a human body infrared sensing device.

In a specific embodiment, a human body infrared sensing device is set in the monitoring area, the human body infrared sensing device monitors whether there is a person in the monitoring area. When the human body infrared sensing device detects that there is a person in the monitoring area, it sends a signal to the information determining module that the person enters the monitoring area.

Information determining module, configured to determine the age of a person in the monitoring area when it is monitored the person in the monitoring area; the information determining module is specifically configured to: collect face images of a person in the monitoring area, when the person is monitored in the monitoring area, perform feature recognition on the face image of the person in the monitoring area, and determine the age of the person in the monitoring area.

And/or, the information determining module is specifically configured to: identify intelligent devices in the monitoring area when monitoring person in the monitoring area; determine the age of the person in the monitored area by reading the age of the user stored in the intelligent device; Further, determine the intelligent device connected to the preset wireless local area network in the monitoring area as the intelligent device in the monitoring area.

In a specific embodiment, when it is detected that there is a person in the monitoring area (a signal sent by the personnel monitoring module is received that there is a person entering the monitoring area), the facial images of the person in the monitoring area is acquired by a plurality of high-definition cameras, and the facial images of the person in the monitoring area is performed feature recognition on, to obtain the ages of the persons in the monitored area.

Alternatively, If a intelligent device is connected to the wireless local area network in the monitoring area, it indicates that the intelligent device is in the area where the local area network is located, and the area where the local area network is located is the monitoring area. In this way, it can be determined that the intelligent device connected to the wireless local area network in the monitoring area is the intelligent device in the monitoring area. Secondly, the age information of the person carrying or wearing a intelligent device can be stored in the intelligent device, and the age of the person in the monitoring area can be determined by reading the age information, wherein the intelligent device includes a smart watch, a smart band, a smart phone, and the like.

Socket control module, configured to control the power-on indicator of the socket in the monitoring area turn off and control the jack baffle of the socket in the monitoring area close according to the age of the person in the monitoring area, wherein, when the jack baffle of the socket is closed, the jack of the socket cannot be inserted; the socket control module is specifically configured to: control the power-on indicator of the socket in the control monitoring area turn off and control the jack baffle of the socket in the monitoring area close, when all the ages of persons in the monitoring area are less than a preset age threshold.

In a specific embodiment, when all of the ages of the persons in the monitoring area are less than a preset age threshold, it indicates that all the persons in the monitoring area are children. The children are easily attracted by the indicator light on the socket without the adult's care, so that the socket is played. At this time, the power-on indicator of the outlet in the control monitoring area is controlled to turn off, preventing the indicator light on the socket from attracting the child to touch the card, to prevent the child from getting an electric shock when playing the socket. At the same time, the jack baffle of the socket in the monitoring area is controlled to close, to prevent the child from inserting a finger or a metal object into the jack of the socket. The conventional socket also includes a jack baffle. But the jack baffle of the conventional socket can be inserted into the jack of the socket by using an object or a finger by vigorously inserting, stabbing, etc. In this solution, when the jack baffle of the socket is closed, the object or finger cannot be inserted into the socket of the socket by vigorously inserting, stabbing, etc.

Alarm module, configured to send an alarm notification to the preset intelligent terminal when the socket control module control the power-on indicator of the socket in the monitoring area turn off.

In a specific embodiment, when the socket control module controls the power-on indicator of the socket in the monitoring area turn off, it indicates that all the persons in the monitoring area are children, and an alarm notification is sent to the parent's intelligent terminal to remind the parents to pay attention to children safety.

In the present application, the personnel monitoring module continuously monitors whether there is a person in the monitoring area, the information determining module determines the age of the person in the monitoring area when monitoring the person in the monitoring area, and the socket control module controls the power-on indicator of the socket in the monitoring area turn off and controls the jack baffle of the socket in the monitoring area close according to the age of the person in the monitoring area. In this way, when a person enters the monitoring area, the age of the person in the monitoring area is determined. And when the person in the monitoring area is considered as a child because of his/her age, the power-on indicator of the outlet in the control monitoring area is controlled to turn off, preventing the indicator light on the socket from attracting the child to touch the card, to prevent the child from getting an electric shock when playing the socket. At the same time, the jack baffle of the socket in the monitoring area is controlled to close, to prevent the child from inserting a finger or a metal object into the jack of the socket to protect the safety of the child and prevent the child from operating the socket to cause harm to the child.

The above is only the preferred embodiment of the present application, but the scope of protection of the present application is not limited thereto, and any equivalents or modifications of the technical solutions of the present application and the application concept thereof should be included in the scope of the present application within the scope of the technical scope of the present application.

What is claimed is:

1. An intelligent socket control system for preventing children from electric shock, characterized by comprising:
    a personnel monitoring module, configured to continuously monitor if there is a person in the monitored area;
    an information determining module, configured to determine an age of a person in the monitoring area when the person is monitored in the monitoring area;
    a socket control module, configured to control the power-on indicator of the socket in the monitoring area to turn off and control the jack baffle of the socket in the monitoring area to close according to the age of the person in the monitoring area, wherein, when the jack baffle of the socket is closed, an object cannot be inserted into the jack of the socket.

2. The intelligent socket control system for preventing children from electric shock according to claim 1, characterized in that, the personnel monitoring module is specifically configured to: monitor whether there is a person in the monitoring area by using a human body infrared sensing device.

3. The intelligent socket control system for preventing children from electric shock according to claim 1, characterized in that, the information determining module is specifically configured to:
collect face images of a person in the monitoring area, when the person is monitored in the monitoring area;
perform feature recognition on the face images of the person in the monitoring area, and determine the age of the person in the monitoring area.

4. The intelligent socket control system for preventing children from electric shock according to claim 1, characterized in that, the information determining module is specifically configured to:
Identify an intelligent device in the monitoring area when the person is monitored in the monitoring area;
determine the age of the person in the monitored area by reading the age of the user stored in the intelligent device.

5. The intelligent socket control system for preventing children from electric shock according to claim 4, characterized in that, the information determining module is specifically configured to: determine the intelligent device connected to a preset wireless local area network in the monitoring area as the intelligent device in the monitoring area.

6. The intelligent socket control system for preventing children from electric shock according to claim 1, characterized in that, the socket control module is specifically configured to: control the power-on indicator of the socket in the control monitoring area to turn off and control the jack baffle of the socket in the monitoring area to close, when ages of all the persons in the monitoring area are less than a preset age threshold.

7. The intelligent socket control system for preventing children from electric shock according to claim 1, characterized by further comprising an alarm module, connected to the socket control module, the alarm module is configured to send an alarm notification to a preset intelligent terminal when the socket control module controls the power-on indicator of the socket in the monitoring area to turn off.

\* \* \* \* \*